US009445255B2

(12) United States Patent
Witsaman et al.

(10) Patent No.: US 9,445,255 B2
(45) Date of Patent: Sep. 13, 2016

(54) SYSTEM TO PROVIDE GSM OVER DISTRIBUTED MOBILE NETWORKS

(71) Applicant: Globe Wireless LLC, Palm Bay, FL (US)

(72) Inventors: Mark Witsaman, Melbourne, FL (US); Darryn Trowell, Camberley (GB)

(73) Assignee: INMARSAT SOLUTIONS LIMITED, London (GB)

( * ) Notice: Subject to any disclaimer, the term of this patent is extended or adjusted under 35 U.S.C. 154(b) by 342 days.

(21) Appl. No.: 14/039,756

(22) Filed: Sep. 27, 2013

(65) Prior Publication Data

US 2014/0024364 A1  Jan. 23, 2014

Related U.S. Application Data

(62) Division of application No. 13/208,642, filed on Aug. 12, 2011, now Pat. No. 8,954,060.

(51) Int. Cl.
H04W 8/02 (2009.01)
H04W 8/26 (2009.01)
H04W 8/12 (2009.01)
H04W 88/18 (2009.01)

(52) U.S. Cl.
CPC ............... H04W 8/02 (2013.01); H04W 8/26 (2013.01); H04W 8/12 (2013.01); H04W 88/181 (2013.01)

(58) Field of Classification Search
CPC .............................. H04W 8/12; H04W 88/16
USPC ....... 455/427–430, 445, 554.1–555; 370/351
See application file for complete search history.

(56) References Cited

U.S. PATENT DOCUMENTS

| | | | | |
|---|---|---|---|---|
| 2001/0018348 A1* | 8/2001 | Joshi | ................. | H04B 7/18517 455/450 |
| 2003/0118012 A1* | 6/2003 | Yi | ........................ | H04Q 3/0025 370/356 |
| 2007/0201361 A1* | 8/2007 | Kumar | ................ | H04L 41/0896 370/230 |
| 2008/0125116 A1* | 5/2008 | Jiang | ....................... | H04W 8/06 455/433 |
| 2010/0093344 A1* | 4/2010 | Chan | ....................... | H04W 8/02 455/433 |

* cited by examiner

Primary Examiner — Dung Hong
(74) Attorney, Agent, or Firm — Baker & Hostetler, LLP

(57) ABSTRACT

A system provides GSM service over distributed mobile networks. A Network Area Controller (NAC) allows Global Titles (GT) and Mobile Station Roaming Numbers (MSRN) of the GSM network to be shared within a private GSM network. A processor within the Mobile Switching Center (MSC) of a mobile network transcodes voice data and maps the data to the proper bearer QoS to allow the use of Mobile Satellite Services (MSS) such as Iridium and Inmarsat.

18 Claims, 4 Drawing Sheets

SYSTEM TO PROVIDE GSM OVER DISTRIBUTED MOBILE NETWORKS

CROSS-REFERENCE TO RELATED APPLICATIONS

This application is a divisional of and claims the benefit from U.S. application Ser. No. 13/208,642 filed on Aug. 12, 2011, which is hereby incorporated by reference in its entirety for all purposes as if fully set forth herein.

FIELD OF THE INVENTION

The present invention relates generally to a private network within the Global System for Mobile Communications (GSM) network. More particularly, the present invention relates to a GSM private network that provides communication over distributed mobile networks.

BACKGROUND OF THE INVENTION

GSM is a set of telecommunication standards created by the European Telecommunications Standards Institute (ETSI) specifying the infrastructure of a digital cellular service. At the top level, the GSM system comprises a small number of networks that provide service around the world through interconnect agreements with each other. Access to the networks via sub-networks of service providers, which ultimately offer service to users, is usually accomplished through signaling brokers.

A GSM network includes a Home Location Register (HLR), which is a database of mobile subscriber information for a service provider's subscriber base. The information includes, for example, the International Mobile Subscriber Identity (IMSI), service subscription information, and location information, which includes the current Visitor Location Register (VLR) serving the subscriber, and service restriction and supplementary service information.

A VLR is a database that includes information about a mobile subscriber (user device) currently located in a given Mobile Switching Center (MSC) serving area when that serving area does not include the subscriber's HLR. Typically, there is one VLR per MSC, and the VLR and HLR exchange information regarding a user device. A network served by an MSC/VLR pair can be referred to as a mobile network. A mobile network may be, for example, ship-based such that the mobile network itself, as well as each of the user devices it serves, is mobile. A mobile network may instead be land-based with only the user devices being mobile.

In GSM, the Mobile Station International Subscriber Directory Number (MSISDN) is used to locate and route calls to a given user device. In addition, during each call setup phase, a user device is temporarily assigned a Mobile Station Roaming Number (MSRN) by its current MSC, which is used to help locate the user device when it receives a call by allowing the gateway system to route the call to the current serving MSC.

Traditionally, a service provider operates mobile networks that each require their own GT and set of MSRNs. However, the number of GTs and MSRNs available from a signaling broker is limited, which can limit the number of mobile networks a service provider can operate. Typically, a signaling broker buys a set of GTs and MSRNs from a GSM network and leases them to private GSM network providers. Thus, each additional GT and MSRN, even if available, represents an additional cost to the service provider.

The mobile networks may use a Very Small Aperture Terminal (VSAT) to relay voice data via satellite. For example, a ship-based mobile network may communicate via satellite. While the VSAT system offers a dedicated data channel with quality of service (QoS), or service and/or subscription based prioritization of traffic, VSAT equipment is expensive in relation to equipment for other Mobile Satellite Services (MSS) such as IRIDIUM and INMARSAT.

However, conventional use of MSS such as IRIDIUM and INMARSAT has also presented problems. Traditional implementations of GSM using MSS have used a Foreign Exchange Office (FXO) interface, which is a connector that allows an analog connection to the public switched telephone network (PSTN). For example, the Globe i250 from Globe Wireless, which included an INMARSAT Fleet-Broadband (FBB) terminal coupled with the MSC/VLR, also included an FXO interface to allow analog call transmission from a mobile network using the FBB to the PSTN.

The use of the FXO interface presents issues because the call is never muted back through the core GSM network throughout its duration. As a result, the service provider cannot easily and accurately track the duration of the call in order to properly bill the call based on usage. Additionally, the call recipient not within the mobile network (the recipient of a call placed from a ship using FBB, for example) sees the MSS number rather than the MSISDN of the calling user device. Related to this, user devices within the mobile terminal using FBB cannot cost-effectively receive calls.

SUMMARY OF THE INVENTION

The present invention addresses at least the issues discussed above.

A private GSM network refers to a sub-network within a GSM network that includes a set of mobile networks that all share a single Network Area Controller (NAC). The addition of the NAC to the private GSM network architecture shifts the intelligence from the core GSM network to the mobile network level. The NAC facilitates this change in the network architecture through a sharing scheme for GTs and MSRNs.

Including a processor in the MSC that can transcode incoming voice data and map the output to one of a plurality of bearer channels allows mobile networks to transmit via MSS without the conventional billing and call termination issues discussed above.

In accordance with one embodiment of the present invention, a private communication network within the (Global System for Mobile communications) GSM network, the private communication network comprising a plurality of mobile networks, each of the mobile networks comprising a local Global Title (GT) and each comprising a plurality of user devices and all of the plurality of user devices of all of the plurality of mobile networks sharing one or more GTs of the GSM network, the one or more GTs being less than a number of the plurality of mobile networks, and a controller configured to translate between a local GT of one of the plurality of mobile networks and the real GT, the plurality of mobile networks of the private communication network sharing the controller.

In accordance with another embodiment of the present invention, a private communication network within the (Global System for Mobile communications) GSM network, the private communication network comprising a plurality of mobile networks, each of the mobile networks comprising a plurality of local mobile station roaming numbers (MSRN)

and each comprising a plurality of user devices and all of the plurality of user devices of all of the plurality of mobile networks sharing one or more real MSRNs of the GSM network, a number of the plurality of real MSRNs being less than a number of the plurality of user devices of the plurality of mobile networks; and a controller configured to translate between a local MSRN and one of the one or more real MSRNs, the plurality of mobile networks of the private communication network sharing the controller.

In accordance with yet another embodiment of the present invention, a satellite communication system comprises a base transceiver station (BTS) in communication with a plurality of user terminals; and a processor configured to transmit signaling data at a first quality of service (QoS) level and voice data at one of a plurality of second QoS levels, the first QoS level being less than any of the plurality of second QoS levels.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION

Figure 1:
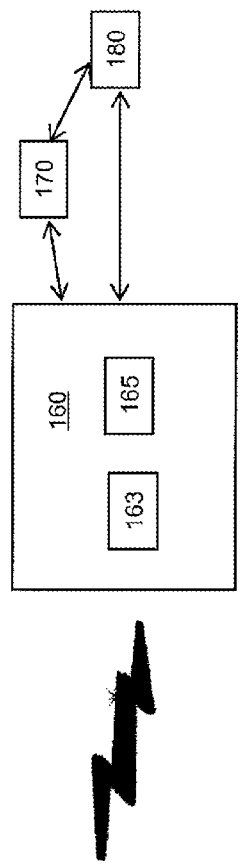
FIG. 1 is a block diagram of an exemplary private GSM network, according to a preferred embodiment of the invention.
Figure 1:
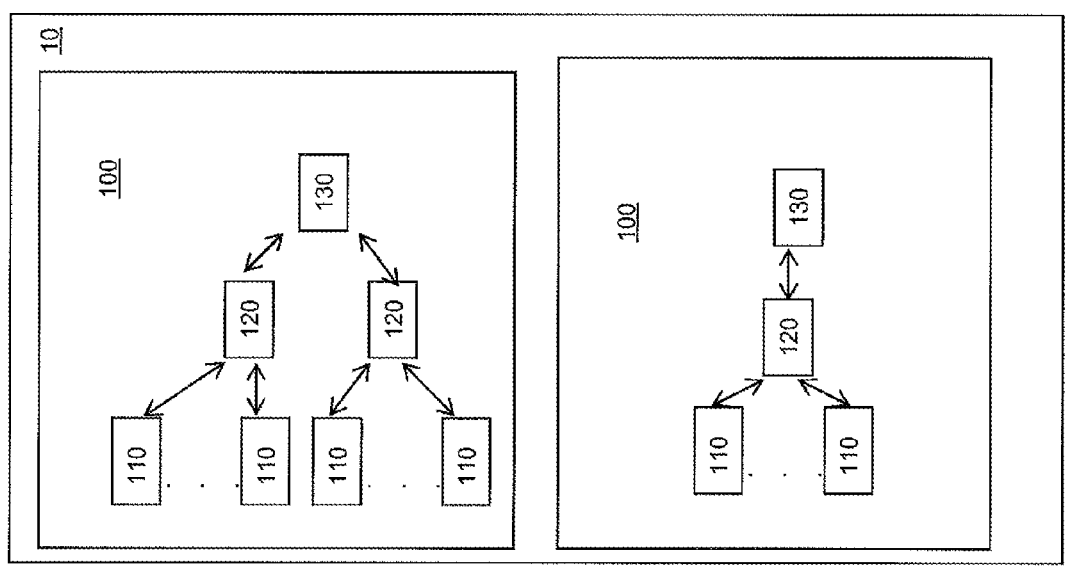

FIG. 1 shows an exemplary private GSM network 10 according to a preferred embodiment of the invention. Although only two mobile networks 100 are shown, any number of mobile networks 100 included within a private GSM network 10 is contemplated. Each mobile network 100 includes a MSC/VLR pair 130, one or more BTS 120 based on expected usage, and numerous user devices 110. For explanatory purposes, a private GSM network 10 is defined as one within which all the mobile networks 100 share a NAC 160. Although shown together in this exemplary embodiment, the MSC/VLR pair 130 may be housed separately in one or more elements that communicate with each other. FIG. 1 also shows an HLR 170 and GMSC 180 on the core network side.

The NAC 160 stores the real GTs and MSRNs obtained for the private GSM network 10. The "real" GT and "real" MSRN refer to those obtained from a signaling broker, for example, and recognized by the small number of networks at the top level of the GSM system as being part of their interconnect agreements. In the present embodiment of the invention, the number of real GTs is fewer than the number of mobile networks 100 in the private GSM network 10, and the number of real MSRNs is less than the number of user devices 110 registered within the private GSM network 10. In order to operate the private GSM network 10 with fewer GTs than the number of mobile networks 100 and with fewer MSRNs than the number of user devices 110, the NAC 160 facilitates a sharing scheme within the private GSM network 10.

The sharing scheme facilitates a change in the network architecture, from the conventional GSM arrangement, within the private GSM network 10. The network architecture facilitated by the sharing of real GTs and MSRNs is more efficient than the network architecture of the conventional GSM arrangement because the intelligence is shifted down to the mobile network level from the core network level.

An exemplary private network 10 may have 8 real GTs and 20 real MSRNs shared among 10,000 user devices 110 (or MSISDNs) and 600 mobile networks 100 (600 local GTs). The example shows that the number of real MSRNs may not only be less than the number of user devices 110 in the private GSM network 10 but may also be less than the number of mobile networks 100 within the private GSM network 10.

The NAC 160 assigns a local GT to each mobile network 100 and requests, on an as-needed basis during call setup, local MSRNs from a mobile network 100 for call termination to a user device 110 within the mobile network 100. The term "local" is used to mean within the private GSM network 10 only. The NAC 160 maintains a registry 163 of the correspondence between each assigned local GT and MSRN and the real GT and MSRN of the GSM network that were obtained for use within the private GSM network 10. The NAC 160 can change the local GT assignment and update the registry 163, as needed. For example, based on the addition of a mobile network 100 to the private GSM network 10, the NAC 160 may assign a local GT to the new mobile network 100 and update the registry 163 accordingly. As another example, based on a network configuration change, such as a new provider assigning new real GTs to the private GSM network 10, the NAC 160 can re-assign local GTs and update the registry 163. In one example, all of the local GTs assigned to the mobile networks 100 of the private GSM network 10 may correspond to a single real GT. Alternately, more than one real GT may be shared among the mobile networks 100, as shown by Table 1, below.

TABLE 1

|  | local GT | real GT |
| --- | --- | --- |
| Mobile Network 1 | local GT 1 | real GT 1 |
| Mobile Network 2 | local GT 2 | real GT 1 |

TABLE 1-continued

|  | local GT | real GT |
|---|---|---|
| Mobile Network 3 | local GT 3 | real GT 2 |
| Mobile Network 4 | local GT 4 | real GT 3 |
| Mobile Network 5 | local GT 5 | real GT 3 |
| Mobile Network 6 | local GT 6 | real GT 3 |

A sharing scheme is also contemplated for MSRNs with two differences from the scheme discussed for sharing GTs: (1) the local MSRN assignment is temporary and on an as-needed basis during call setup and (2) the assigned local MSRN for a given user device 110 may change from one call setup to another. An MSRN is needed by a user device 110 within a mobile network 100 only when the user device 110 (which has a unique MSISDN) receives a call from outside its own mobile network 100. A local MSRN and corresponding real MSRN are used to route and establish the call as shown in detail in the signal flow diagrams discussed below. The assignment of real MSRNs and their correspondence to local MSRNs is done on a rolling basis. That is, when a call is incoming to a user device 110, the MSC of the MSC/VLR 130 pair of the mobile network 100 of the user device 110 assigns the next in the set of local MSRNs made available by the NAC 160. The NAC 160 then associates that local MSRN with the next available real MSRN. For each subsequent incoming call to any user device 110, the procedure is repeated (the MSC/VLR 130 associated with the user device 110 assigns the next available local MSRN and the NAC 160 associates that local MSRN with the next available real MSRN).

The registry 163 of the NAC 160 may be implemented in the form of a look-up table, for example. The processor 165 of the NAC 160 translates a real GT and MSRN on the GSM network side to the corresponding local GT and MSRN assigned within the private GSM network 10, as discussed in relation to FIG. 2 below.

Figure 2:
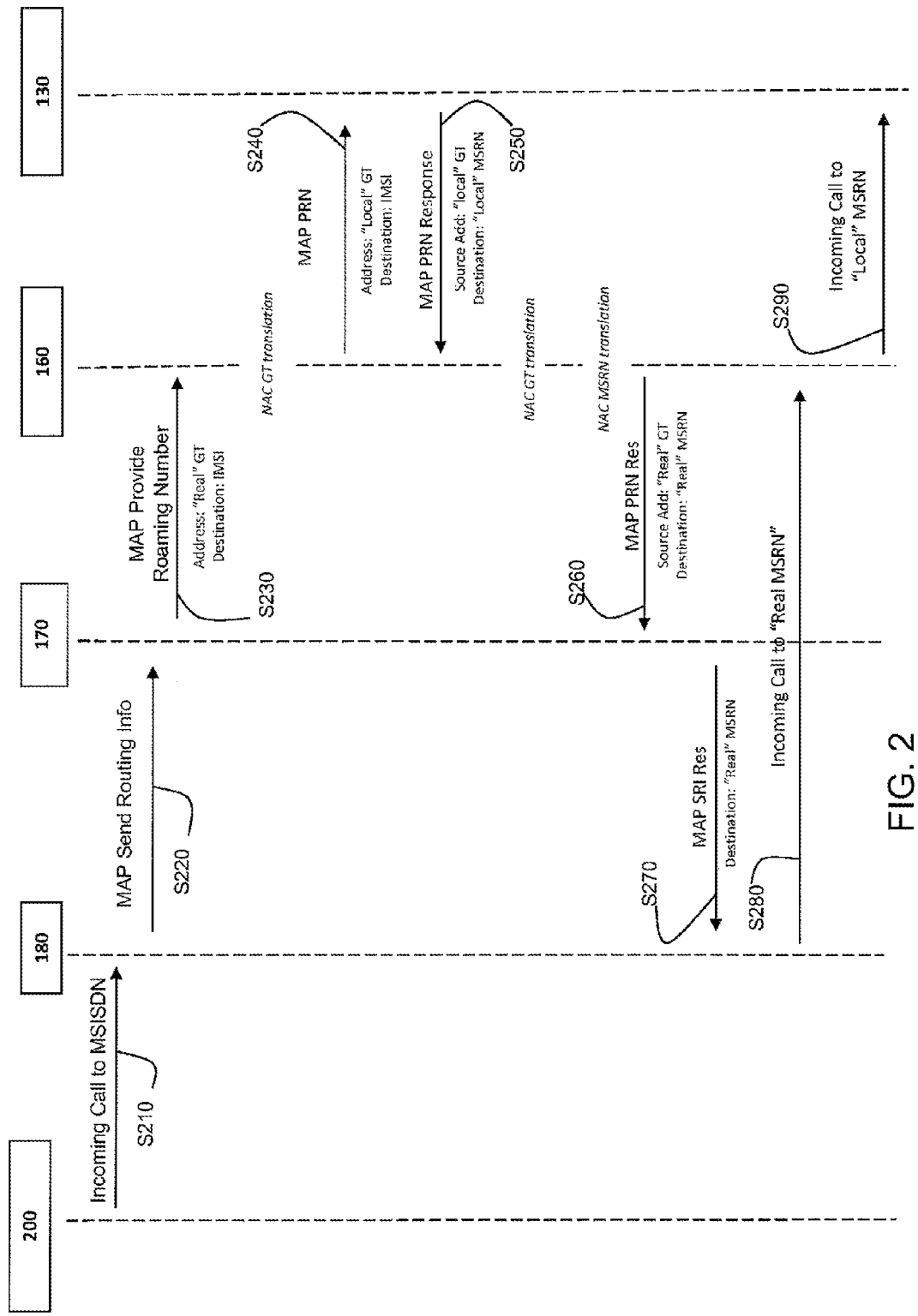
FIG. 2 is a signal flow diagram of a call to a user device within a private GSM network, according to an embodiment of the invention.

FIG. 2 is a signal flow diagram of a call to a user device 110 within a private GSM network 10, according to a preferred embodiment. S2 10 is a signal from the external network 200 indicating an incoming call intended for a target user device 110 within a mobile network 100 of a private GSM network 10. The Gateway Mobile Switching Center (GMSC) 180, which is part of the core network equipment, cannot determine which NAC 160 the call should be directed to in order to reach the target user device 110, identified by its MSISDN in S210. The GMSC 180 sends a Mobile Application Part (MAP) Send Routing Information message requesting routing information in S220 to the HLR 170. Based on the MSISDN of the target user device 110, the HLR 170 determines the appropriate NAC 160 to contact regarding the call and sends a MAP Provide Roaming Number (PRN) message at S230 to the NAC 160 that serves the target user device 110. The signal S230 includes the real GT and a request for a real MSRN. The NAC 160 forwards the MAP PRN message at S240 to the MSC/VLR 130 in the mobile network 100 of the target user device 110 to request a roaming number. S240 includes the local GT, which is associated with the real GT in the NAC 160, and the IMSI of the target user device 110.

In response, the MSC/VLR 130 sends a MAP PRN Response message, at S250, back to the NAC 160. S250 includes the local GT and a local MSRN, which is the next free local MSRN from a pool of MSRNs made available to the MSC/VLR 130 by the NAC 160. The processor 165 of the NAC 160 uses its registry 163 to associate the local GT in S250 with the corresponding real GT and to assign the next available real MSRN to correspond with the local MSRN in S250. The NAC 160 sends a MAP PRN Response message at S260 to the HLR 170 with the real GT and real MSRN. In turn, the HLR 170 sends a MAP Send Routing Information (SRI) message at S270 to the GMSC 180. The incoming call is then routed from the GMSC 180 to the NAC 160 with the real MSRN in S280 and is forwarded from the NAC 160 to the MSC/VLR 130 with the corresponding local MSRN in S290.

In the above exemplary signal flow, the HLR 170 knows which NAC 160 serves a given target user device 110 and the NAC 160 knows which mobile network 100 the target user device 110 is currently served by in order to route the incoming call correctly. This knowledge is acquired because every user device 110 that will use a given mobile network 100 must first register the Subscriber Identity Module (SIM) card issued by the private GSM network provider with the mobile network 100. Following that registration with the private GSM network 10, any of the following scenarios is possible.

If the user device 110 initiates a call to another user device 110 within the mobile network 100, the call need not go beyond the MSC/VLR 130 and exit the mobile network 100. Further, real/local MSRN is not necessary to set up the call.

If the user device 110 initiates a call to another user device 110 outside of its mobile network 100 but within its private GSM network 10, the call must still be routed beyond its MSC/VLR 130 through the NAC 160 that serves both mobile networks 100. In this case, the MSC/VLR 130 of the user device 110 that is the call recipient must assign a local MSRN to set up the call, and the NAC 160 must associate a real MSRN with the local MSRN to complete the call setup procedure.

If the user device 110 initiates a call to a device outside of its mobile network 100 and outside of its private GSM network 10, the private GSM network 10 associated with the receiving user device 110 must assign a real MSRN for use during the call setup procedure.

Figure 3:
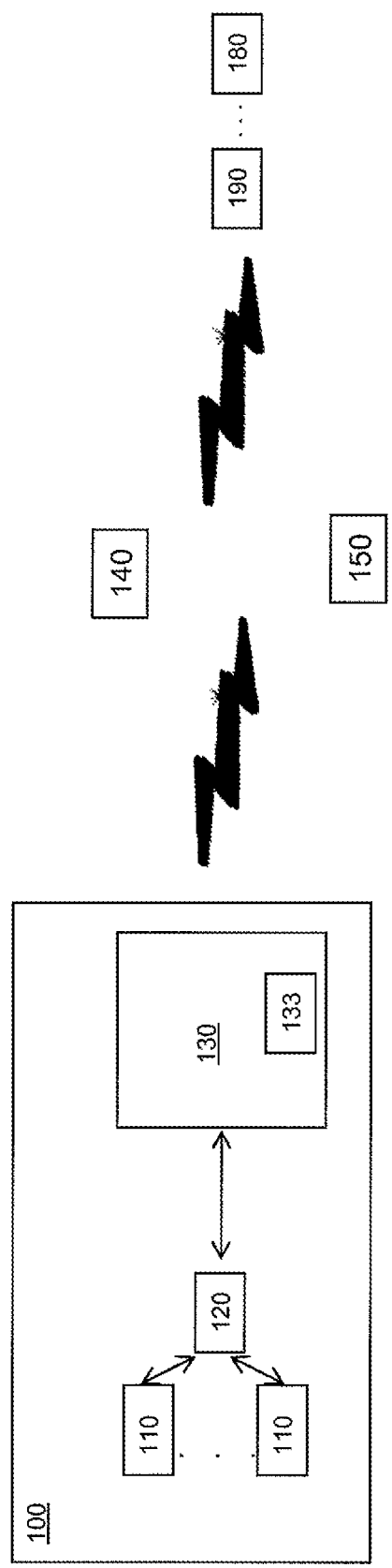
FIG. 3 is a block diagram of an exemplary mobile network communicating over MSS, according to an embodiment of the invention.

FIG. 3 shows a block diagram of an exemplary mobile network 100 communicating over exemplary MSS, IRIDIUM 140 and INMARSAT 150, according to an embodiment of the invention. The processor 133 of the MSC in the MSC/VLR unit 130 transcodes outgoing signals from the BTS 120 based on a predetermined selection of the MSS bearer (IRIDIUM 140 or INMARSAT 150, for example) to be used for transmission. Communication via VSAT is still contemplated with the processor 133, and the processor 133 may transcode the voice data for transmission over VSAT, as well. The voice data is routed through the MSS gateway 190 but the call is terminated at the GMSC 180.

Figure 4:
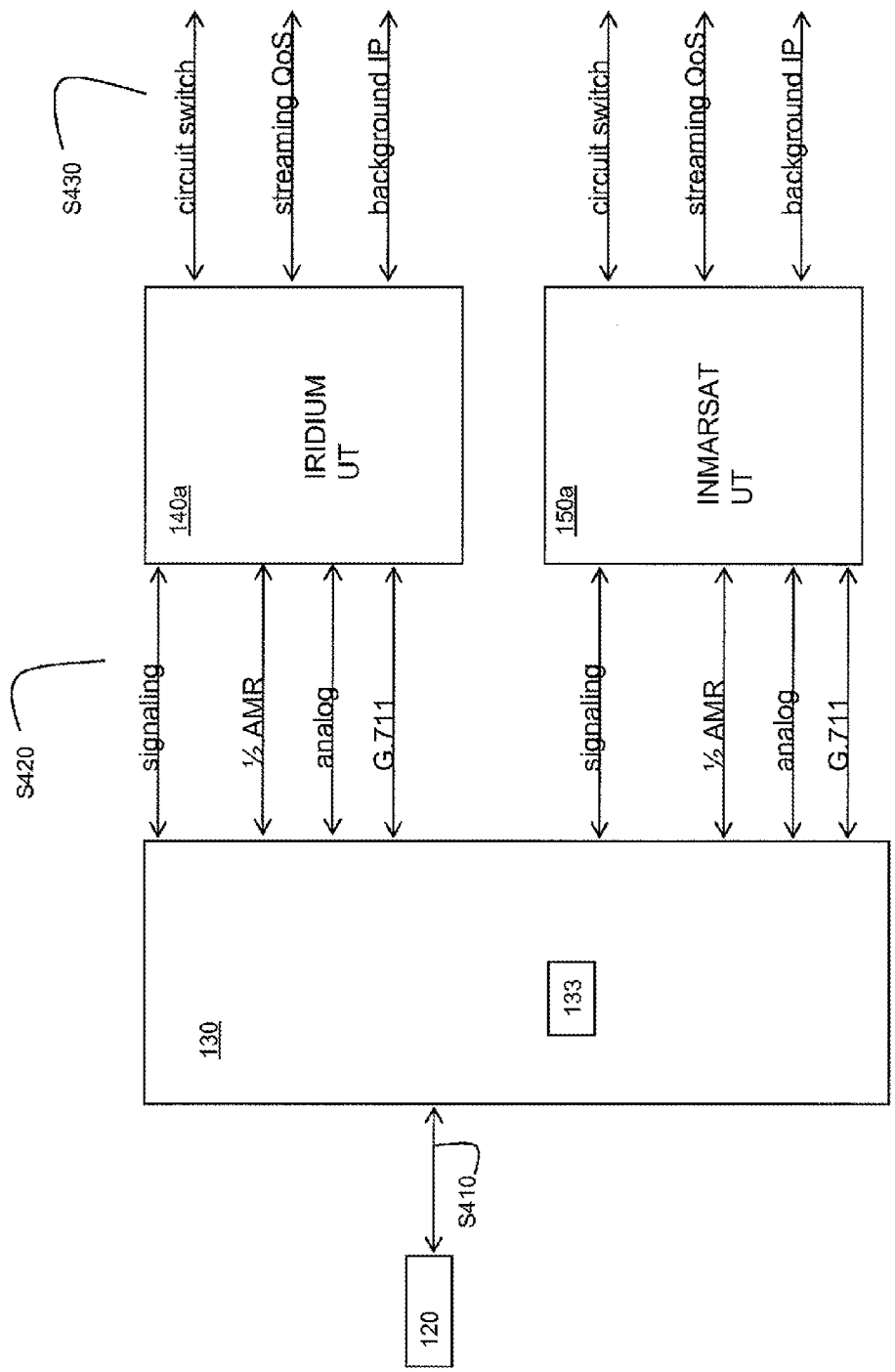
FIG. 4 depicts transcoding operations performed by the processor of the MSC, according to an embodiment of the invention.

FIG. 4 shows exemplary transcoding operations performed by the processor 133 of the MSC in the MSC/VLR unit 130 according to a preferred embodiment. The transcoded signals s420 from the MSC/VLR 130 are transmitted to MSS, such as IRIDIUM 140 and INMARSAT 150, through the corresponding user terminal (UT) 140*a* or 150*a*, respectively. The UTs 140*a* and 150*a* output signals S430, which may be further transcoded, for ultimate transmission over the corresponding satellite service, 140 or 150. The UTs 140*a* and 150*a* may be incorporated within the MSC/VLR 130 or housed separately, in whole or in part.

Voice data s410 is transmitted from the BTS 120 to the MSC/VLR 130 as full rate, enhanced full rate, or adaptive multi-rate, for example. The MSC/VLR 130 then transcodes the voice data into a signal s420. For example, s420 has an intermediate codec and the MSC/VLR 130 passes the call to the appropriate UT 140*a* or 150*a*, based on preselection, via a standard circuit switched channel, or s420 is streaming IP data. The MSC/VLR 130 not only transcodes the incoming voice data s410 but also maps the data s420 to the proper bearer channel (with corresponding QoS) for transmission via preselected MSS. The transcoding operation is done in reverse for incoming voice data.

The signaling channel is on the Packet Data Network (PDN). Each of the bearer channels shown for voice data s420 represents a different QoS. The processor 133 can perform dynamic switching of QoS, that is, the processor 133 can use the signaling channel, as needed, during voice call establishment and during the duration of the voice call.

The NAC 160 and processor 133 resolve the issues related to call tracking (for purposes of billing) and call termination for traditional GSM over MSS systems. Previously, using the FXO interface resulted in the voice call being routed from the MSS gateway 190 to the PSTN and not having a voice path to the GMSC 180 for termination of the call. This resulted in the GMSC 180 not being directly aware of the call duration or the proper MSISDN of the user device 110 placing the call over the MSS. Because the NAC 160 allows the MSISDN of the user device 110 to be known to the GMSC 180 as shown by the signal flow diagram at FIG. 2, for example, and because the processor 133 allows the call over MSS to be terminated at the GMSC 180, the duration of a call can easily and accurately be tracked for billing purposes, and the MSISDN of the user device 110 can be used to provide a callback number, rather than the MSS number, to the recipient of the call.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A private communication network within a (Global System for Mobile communications) GSM network, the private communication network comprising:
    a plurality of mobile networks, each of the mobile networks comprising a local Global Title (GT) and each comprising a plurality of user devices and all of the plurality of user devices of all of the plurality of mobile networks sharing one or more real GTs of the GSM network, the one or more real GTs being less than a number of the plurality of mobile networks; and
    a controller configured to translate between a local GT of one of the plurality of mobile networks and one of the one or more real GTs, the plurality of mobile networks of the private communication network sharing the controller,
    wherein each of the plurality of mobile networks comprises a mobile switching center (MSC) and a visitor location register (VLR) in communication with one or more base transceiver stations (BTS) comprised by the mobile network; and
    wherein the MSC and the VLR of each of the plurality of mobile networks provide periodic updates of the respective local GT to the controller.

2. The network according to claim 1, wherein the controller comprises a registry of each local GT of each of the plurality of mobile networks.

3. The network according to claim 1, wherein each of the plurality of mobile networks comprises the one or more BTS in communication with the user devices of the mobile network.

4. The network according to claim 1, wherein the controller receives communication from at least one of the plurality of mobile networks via satellite.

5. The network according to claim 1 wherein each of the mobile networks comprising a plurality of local mobile station roaming numbers (MSRN) and each of the plurality of user devices and all of the plurality of user devices of all of the plurality of mobile networks sharing one or more real MSRNs of the GSM network.

6. The network according to claim 5 wherein a number of the plurality of real MSRNs being less than a number of the plurality of user devices of the plurality of mobile networks.

7. The network according to claim 6 wherein the controller configured to translate between a local MSRN and one of the one or more real MSRNs, the plurality of mobile networks of the private communication network sharing the controller.

8. The network according to claim 7 wherein the controller dynamically assigns a real MSRN to one of the plurality of user devices of one of the plurality of mobile networks on an as-needed basis.

9. The network according to claim 1 wherein the controller comprises a table of local mobile station roaming numbers (MSRNs) and corresponding real MSRNs and routes a call received for one of the plurality of user devices in one of the plurality of mobile network based on a correspondence in the table between the real MSRN associated with the call and a local MSRN.

10. A communication network within a (Global System for Mobile communications) GSM network, the communication network comprising:
    a plurality of mobile networks, each of the mobile networks comprising a local Global Title (GT) and each comprising a plurality of user devices and all of the plurality of user devices of all of the plurality of mobile networks sharing one or more real GTs of the GSM network, the one or more real GTs being less than a number of the plurality of mobile networks; and
    a controller configured to translate between a local GT of one of the plurality of mobile networks and one of the one or more real GTs, the plurality of mobile networks of the communication network sharing the controller,
    wherein each of the plurality of mobile networks comprises a mobile switching center (MSC) and a visitor location register (VLR) in communication with one or more base transceiver station (BTS) comprised by the mobile network; and
    wherein the MSC and the VLR of each of the plurality of mobile networks provide periodic updates of the respective local GT to the controller.

11. The network according to claim 10, wherein the controller comprises a registry of each local GT of each of the plurality of mobile networks.

12. The network according to claim 10, wherein each of the plurality of mobile networks comprises the one or more BTS in communication with the user devices of the mobile network.

13. The network according to claim 10, wherein the controller receives communication from at least one of the plurality of mobile networks via satellite.

14. The network according to claim 10 wherein each of the mobile networks comprising a plurality of local mobile station roaming numbers (MSRN) and each comprising a plurality of user devices and all of the plurality of user devices of all of the plurality of mobile networks sharing one or more real MSRNs of the GSM network.

15. The network according to claim 14 wherein a number of the plurality of real MSRNs being less than a number of the plurality of user devices of the plurality of mobile networks.

16. The network according to claim 15 wherein the controller configured to translate between a local MSRN and one of the one or more real MSRNs, the plurality of mobile networks of the communication network sharing the controller.

17. The network according to claim 16 wherein the controller dynamically assigns a real MSRN to one of the plurality of user devices of one of the plurality of mobile networks on an as-needed basis.

18. The network according to claim 10 wherein the controller comprises a table of local mobile station roaming numbers (MSRNs) and corresponding real MSRNs and routes a call received for one of the plurality of user devices in one of the plurality of mobile network based on a correspondence in the table between the real MSRN associated with the call and a local MSRN.

* * * * *